United States Patent

[11] 3,564,123

[72] Inventor Evangelos I. Pezirtzoglov
Mountain View, Calif.
[21] Appl. No. 721,538
[22] Filed Mar. 18, 1968
[45] Patented Feb. 16, 1971
[73] Assignee Ampex Corporation
Redwood City, Calif.
a corporation of California

[54] CHROMA INVERTER
14 Claims, 2 Drawing Figs.

[52] U.S. Cl. .......... 178/5.4; 178/6.6
[51] Int. Cl. .......... H04n 5/78; H04n 9/02
[50] Field of Search .......... 178/5.4CR, 5.4

[56] References Cited
UNITED STATES PATENTS
3,463,874 8/1969 Hodge .......... 178/5.4

*Primary Examiner*—Richard Murray
*Assistant Examiner*—Joseph A. Orsino, Jr.
*Attorney*—Robert G. Clay

ABSTRACT: A circuit for inverting the phase of the chroma component of a composite color video signal, without altering the luminance or synchronizing pulse components thereof, in response to a command signal. The circuit is particularly useful in the slow- or stop-motion replay of color television signals recorded on a magnetic medium, such as a magnetic disc, wherein single fields of the composite color video signal are transmitted repeatedly and phase discontinuities would occur in the chroma component thereof at the beginning of each repeated field unless the phase of the chroma component is inverted relative to the luminance and synchronizing pulse components in a predetermined periodic manner.

INVENTOR.
EVANGELOS I. PEZIRTZOGLOU
BY Robert G. Clay
ATTORNEY

CHROMA INVERTER

BACKGROUND OF THE INVENTION

A novel system for the slow- and stop-motion replay of color television signals is disclosed in copending U.S. Pat. application Ser. No. 713,901, of B. M. Poole et al. filed Mar. 18, 1968, and assigned to the same assignee of the present invention. Briefly, such system provides for the separate recording of successive fields of the television signal on a magnetic disc, or equivalent means, and play back of complete fields therefrom in selectable repetition patterns and orders to provide various effects including stop motion, and normal, slow, and fast motion in both forward and reverse directions. It will be understood that, in such apparatus, when single fields of a composite color television signal are played back repeatedly or in certain orders in the conduct of various of the foregoing modes of replay operation, phase discontinuities would normally occur in the chroma component of the signal at the beginning of each repeated field. This would cause loss of synchronization of the local oscillator in the chroma detector of a color-television receiver, and hence distorted color values, as well as destruction of the frame-to-frame dot interlace, reducing the visibility of the dot structure in a color picture. However, phase continuity of the chroma component is restored by periodic inversion of the phase of the chroma component relative to the luminance and synchronizing pulse components of the composite color video signal in predetermined manners which depend upon the particular playback mode. The system disclosed in the previously referenced copending patent application includes logic circuitry for developing a command signal at the times inversion of the chroma component is required to restore phase continuity. The command signal controls a chroma inverter for applying the video signal to the output with zero or 180° phase shift of the chroma component respectively in response to the absence or presence of the command signal.

SUMMARY OF THE INVENTION

The present invention relates to a chroma inverter for shifting the phase of the chroma component of a composite color video signal 180° relative to the luminance and synchronizing pulse components thereof in response to a command signal. The invention may be advantageously employed to accomplish the chroma inversion function in the system for slow- and stop-motion replay of color television signals disclosed in the aforereferenced copending patent application and previously briefly discussed herein.

As an important feature of the invention the inverter is arranged to shift the phase of the chroma component precisely 180° responsive to the command signal, without altering the luminance or synchronizing pulse components. In this regard the inverter basically includes means for extracting the chroma component from the composite color television signal and transmitting the chroma component and remaining luminance and synchronizing pulse components through two separate channels. An adder, or equivalent means is coupled to the outputs of the channels to recombine the separated components transmitted therethrough. The chroma channel includes means for shifting the phase of the chroma component passed therethrough 180° in response to a chroma inversion command signal, while otherwise passing the chroma component with zero phase shift. The phase versus frequency characteristic of the chroma channel is such that the phase is zero at the frequency of the color subcarrier of the chroma component, and the time delays of both channels are identical. As a result, in the recombined composite signal from the adder, the chroma component has its original phase relative to the luminance and synchronizing pulse components, or is shifted precisely 180° relative thereto in response to a command signal.

DETAILED DESCRIPTION OF THE PREFERRED EMBODIMENT

Figures 1, 2:
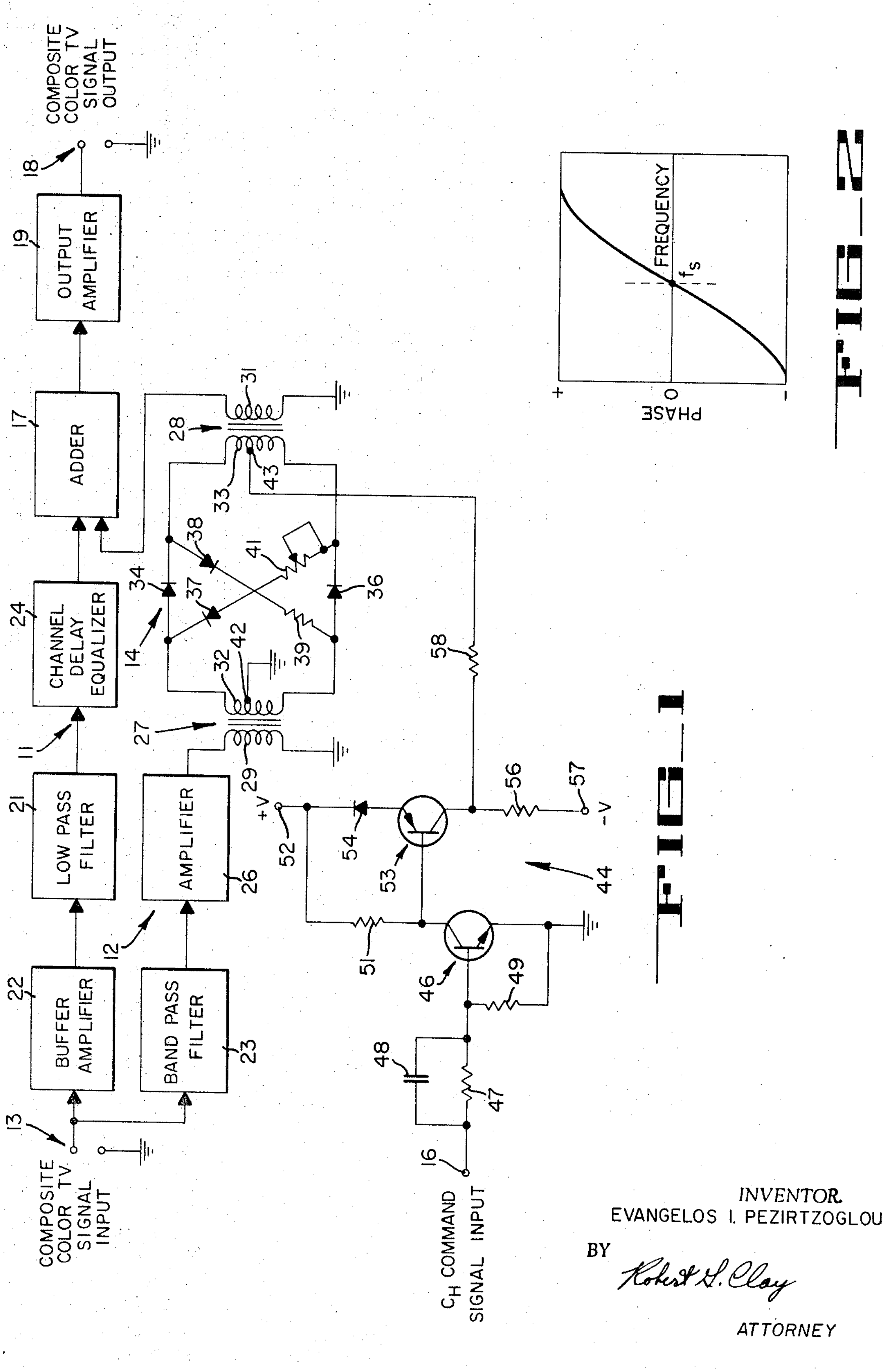
FIG. 1 is a block diagram, partially in schematic, of a chroma inverter in accordance with the invention.
FIG. 2 is a phase versus frequency characteristic of the chroma channel of the inverter.

As shown in FIG. 1, a chroma inverter in accordance with the present invention generally includes a luminance and synchronizing pulse channel 11 and chroma channel 12 commonly coupled to composite color television signal input terminals 13. The channels are arranged to separate the chroma component from the luminance and synchronizing pulse components of the composite signal for transmission through the respective channels. Included in the chroma channel 12 is a phase inverter means 14 which is arranged to shift the phase of the chroma component 180° in response to a chroma inversion command signal, $C_H$, applied to a command input terminal 16. The outputs of channels 11 and 12 are coupled to signal combining means, such as an adder 17, in turn coupled to composite color signal output terminals 18 as by means of an output amplifier 19. Thus, the luminance and synchronizing pulse components from channel 11 and the chroma component from channel 12, noninverted or inverted in accordance with the absence or presence of the command signal $C_H$, are recombined by the adder to form the composite signal for application to the output terminals 18.

In order to effect the previously mentioned separation of the composite signal into its components, channel 11 includes a low-pass filter 21 coupled to input terminals 13, preferably by means of a buffer amplifier 22, while channel 12 includes a band-pass filter 23 also coupled to the input terminals. The buffer amplifier serves to prevent interactions between the filters. The low-pass filter has a cutoff frequency below the lower side band of the chroma component and is consequently only passive to the luminance and synchronizing pulse components of the composite signal. The band-pass filter has a center frequency equal that of the color subcarrier of the chroma component and cutoff frequencies symmetrically encompassing the side bands of the subcarrier, the lower cutoff frequency being equal to or greater than the cutoff frequency of the low-pass filter. Thus, the band-pass filter is only transmissive to the chroma component (except for certain negligibly small luminance components). Consequently, by virtue of the filter arrangement, only the luminance and synchronizing pulse components are transmitted through channel 11 while only the chroma component is transmitted through channel 12.

The output of low-pass filter 21 is applied to one input of adder 17 through a channel delay equalizer 24, or equivalent means for purposes subsequently described. The output of band-pass filter 23 is coupled to the input of phase inverter 14, preferably by means of an amplifier 26, while the output of the inverter 14 is coupled to a second input of the adder.

It will be appreciated that in order for the chroma component in the composite signal at output terminals 18 to have a precisely zero or 180° phase relation to its original phase at input terminals 13, and therefore to the original phase of the luminance and synchronizing pulse components, there must be no difference in the time delays imparted to the signal components transmitted through the respective channels 11 and 12, and no phase shifts imparted to the signal components other than the controlled 180° phase shifts introduced by the inverter 14. To these ends, the channels 11 and 12 are designed to have equal time delays whereby the signal components at the inputs of adder 17 have their original relative positions in time. In addition, the phase versus frequency characteristic of band-pass filter 23 has bipolar inverse symmetry, as shown in FIG. 2, with zero phase occurring precisely at the color subcarrier frequency, $f_s$. The band-pass filter thus does not undesirably shift the phase of the chroma component. In order that the channels 11 and 12 have equal time delays, differences in the delays introduced by the respective low-pass and band-pass filters 21 and 23 are equalized by means of the channel delay equalizer 24 which introduces any time delay to channel 11 required to compensate the difference. Alternatively, low-pass filter 21 may be designed to have a time delay matching that of the band-pass filter 23, in which case the equalizer is eliminated.

Considering now the phase inverter 14 in detail as to the preferred arrangement thereof depicted in FIG. 1, same will be seen to include an input transformer 27 and an output transformer 28. The primary winding 29 of the input transformer is coupled between the output of amplifier 26 and ground, while the secondary winding 31 of the output transformer is coupled between an input of adder 17 and ground. The secondary winding 32 of the input transformer is coupled to the primary 33 of the output transformer by means of a diode switching network arranged to connect such windings without or with phase inversion depending upon the presence or absence of a command signal $C_H$ at terminal 16. In this regard, the network includes a first pair of diodes 34 and 36 respectively coupled between the corresponding ends of windings 32 and 33, and a second pair of diodes 37 and 38 respectively cross coupled between opposed ends of the windings. The polarity senses of the second pair of diodes are reversed relative to the first pair of diodes such that when the first pair are conducting the second pair are nonconducting, and vice versa. More particularly, in the illustrated case, the positive terminals of diodes 34 and 36 are connected to first and second ends of winding 32 while the negative terminals of these diodes are connected to corresponding first and second ends of winding 33. The negative terminal of diode 37 is connected to the first end of winding 32, and the negative terminal of diode 38 is connected through a resistor 39 to the second end of such winding. The positive terminal of diode 38 is connected to the first end of winding 32, and the negative terminal of diode 38 is connected through a resistor 39 to the second end of such winding. The positive terminal of diode 38 is connected to the first end of winding 33, and the positive terminal of diode 37 is connected through a variable balancing resistor 41 to the second end of such winding.

It will be appreciated that when the first pair of diodes 34 and 36 are conducting, corresponding ends of windings 32 and 33 are interconnected whereby a signal applied to winding 29 develops a signal in winding 31 without phase inversion. Conversely, when the second pair of diodes 37 and 38 are conducting, opposed ends of windings 32 and 33 are interconnected such that a signal applied to winding 29 develops a signal of inverted phase in winding 31.

In order that the conductive states of the first pair of diodes 34 and 36 and the second pair of diodes 37 and 38 be reversed in response to a command signal $C_H$ at terminal 16, a center tap 42 of winding 32 is connected to ground, while a center tap 43 of winding 33 is connected to a bipolar bias circuit 44 for switching the polarity of bias at tap 43 between negative and positive levels with respect to ground respectively in response to the absence and presence of the command signal. Consequently, in the absence of a command signal, the negative bias level at center tap 43 renders diodes 34 and 36 conducting, and diodes 37 and 38 nonconducting. Responsive to a command signal, the bias at center tap 43 is switched to a positive level and diodes 34 and 36 are thereby rendered nonconducting while diodes 37 and 38 are rendered conducting. In this manner the phase of a signal coupled between windings 29 and 31 is either not inverted or inverted in accordance with a command signal at terminal 16.

A preferred form of bipolar bias circuit 44, as shown in FIG. 1, will be seen to include an NPN transistor 46 having its base coupled to terminal 16 by the parallel combination of a resistor 47 and capacitor 48, and to ground by a bias resistor 49. The emitter of the transistor is connected to ground while the collector thereof is connected to one side of a load resistor 51, the other side of which is connected to a positive bias terminal 52 having a bias +V impressed thereon. Transistor 46 is thus normally nonconducting and rendered conducting in response to a square wave command signal $C_H$ at terminal 16 switching between ground and a positive level.

The collector of transistor 46 is connected to the base of an opposite conductivity type transistor 53, in the illustrated case a type PNP. The emitter of transistor 53 is coupled to positive bias terminal 52, preferably by means of a reverse biased diode 54. The collector of transistor 53 is connected to one side of a load resistor 56, the other side of which is connected to a negative bias terminal 57 having a bias −V impressed thereon. Transistor 53 is thus normally nonconducting, but rendered conducting in response to conduction of transistor 46, and thus the command signal $C_H$ at terminal 16. As a result the collector of transistor 53 switches between substantially −V and +V as the command signal switches between ground and a positive level. In order that correspondingly switched bipolar biases be established at center tap 43, same is coupled to the collector of transistor 53, preferably by means of a dropping resistor 58.

In the overall operation of the chroma inverter physically described hereinbefore, a composite color television signal at input terminals 13 is separated into its luminance and synchronizing pulse components and chroma component by means of low-pass filter 21 and band-pass filter 23. The luminance and synchronizing pulse components are transmitted through channel 11, which contains the low-pass filter, and the chroma component is transmitted through channel 12, which contains the band-pass filter, with equal time delays to the adder 17 for recombination thereat. By virtue of the phase versus frequency characteristic of the band-pass filter and operation of the phase inverter means 14, the chroma component is transmitted to the adder in the manner previously described with precisely a zero phase of 180° phase shift from its original phase relation to the luminance and synchronizing pulse components in the composite signal at input terminals 13, depending upon the absence or presence of a command signal at terminal 16. The adder thus recombines the components from the respective channels 11 and 12 to form a composite color television signal for transmission by output amplifier 19 to output terminals 18. In this composite output signal, the chroma component is, of course, in the same or inverted phase relative to the luminance and synchronizing pulse components as in the composite input signal at terminals 13, depending upon the absence or presence of the command signal at terminal 16. In this manner the phase of the chroma component of the composite color television signal is periodically inverted without altering the luminance and synchronizing pulse components.

I claim:

1. A chroma inverter for selectively inverting the phase of the chroma component of a composite color television signal relative to the luminance and synchronizing pulse components thereof in response to a command signal comprising, separation means coupled in receiving relation to said composite color television signal for extracting the chroma component therefrom and transmitting the remaining luminance and synchronizing pulse components through a first channel while transmitting said chroma component through a second channel, adder means coupled to said first and second channels for recombining the luminance and synchronizing pulse components and chroma component respectively transmitted through said channels to form a composite color television output signal, and controlled phase inverter means coupled within said second channel and having a first condition in which said chroma component is transmitted therethrough with a 180° phase shift and a second condition in which said chroma component is transmitted therethrough with zero phase shift, said inverter means adapted to receive said command signal and to be selectively disposed in one of said conditions in response thereto.

2. A chroma inverter according to claim 1, further defined by said separation means comprising, a low-pass filter in said first channel and a band-pass filter in said second channel coupled in receiving relation to said composite color television signal, said low-pass filter having a cutoff frequency below that of the lower side band of said chroma component, said band-pass filter having a center frequency equal that of the color subcarrier of said chroma component and cutoff frequencies symmetrically encompassing the side bands thereof.

3. A chroma inverter according to claim 2, further comprising delay equalizer means in one of said channels providing equal time delays for signals therein and said band-pass filter having a phase versus frequency characteristic wherein zero phase occurs precisely at the frequency of said color subcarrier.

4. A chroma inverter according to claim 3, further defined by said delay means being connected in said first channel for compensating differences between the time delays of said low-pass and band-pass filters.

5. A chroma inverter according to claim 1, further defined by said phase inverter means comprising input and output transformers each having a primary and a secondary winding, said primary winding of said input transformer coupled to said separation means to receive said chroma component, said secondary winding of said output transformer coupled to said adder means, a switching network coupling said secondary winding of said input transformer to said primary winding of said output transformer, said network having first and second selectively conductive or nonconductive paths respectively coupling corresponding ends of the secondary winding of said input transformer and primary winding of said output transformer and cross coupling opposed ends of the secondary winding of said input transformer and primary winding of said output transformer, and actuating means responsive to said command signal and coupled to said paths for selectively rendering either said first paths conductive and said second paths nonconductive or said first paths nonconductive and said second paths conductive.

6. A chroma inverter according to claim 5, further defined by said separation means including a low-pass filter in said first channel and a band-pass filter in said second channel commonly coupled in receiving relation to said composite color television signal, said band-pass filter having its output coupled to said input transformer, said low-pass filter having a cutoff frequency below that of the lower side band of said chroma component, said band-pass filter having a center frequency equal to that of the color subcarrier of said chroma component and cutoff frequencies symmetrically encompassing the side bands thereof.

7. A chroma inverter according to claim 6, further defined by said first and second channels having equal time delays and said band-pass filter having a phase versus frequency characteristic wherein zero phase occurs precisely at the frequency of said color subcarrier.

8. A chroma inverter according to claim 7, further defined by said first channel having channel delay equalizer means for compensating differences between the time delays of said low-pass and band-pass filters.

9. A chroma inverter according to claim 5, said network further defined by said first paths having a first pair of diodes respectively coupled between the corresponding ends of said secondary winding of said input transformer and said primary winding of said input transformer and said primary winding of said output transformer, said second paths having a second pair of diodes respectively cross coupled between opposed ends of said secondary winding of said input transformer and primary winding of said output transformer, said second pair of diodes having polarity senses reversed with respect to said first pair of diodes, and said actuating means comprising a bipolar bias circuit coupled to a center tap of said primary winding of said output transformer for applying opposite polarity biases thereto respectively in response to an absence and presence of said command signal, said secondary winding of said output transformer having a center tap connected to ground.

10. A chroma inverter according to claim 9, further defined by said separation means including a low-pass filter in said first channel having an output coupled to said adder means, a buffer amplifier in said first channel for coupling said composite signal to said low-pass filter, and a band-pass filter in said second channel coupled in receiving relation to said composite signal and having an output coupled to the primary winding of said input transformer, said low-pass filter having a cutoff frequency below that of the lower side band of said chroma component, said band-pass filter having a center frequency equal to that of the color subcarrier of said chroma component and cutoff frequencies symmetrically encompassing the side bands thereof.

11. A chroma inverter according to claim 10, further defined by said first and second channels having equal time delays, and said band-pass filter having a phase versus frequency characteristic with bipolar inverse symmetry and zero phase occurring precisely at the frequency of said color subcarrier.

12. A chroma inverter according to claim 9, further defined by said bipolar bias circuit including a first transistor having base, emitter, and collector, said base coupled in receiving relation to said command signal, means coupled to said emitter and collector to bias said transistor to be normally nonconducting in the absence of said command signal and conducting in the presence thereof, a second transistor having base, emitter, and collector, said second transistor being of an opposite conductivity type with respect to said first transistor, said base of said second transistor coupled to said collector of said first transistor, first and second opposite polarity bias sources, means including a load resistor respectively coupling said first and second bias sources to said emitter and collector of said second transistor to normally bias same to be nonconductive in response to nonconduction of said first transistor and to be conductive in response to conduction of said first transistor, said second transistor thereby developing opposite polarity biases across said load resistor respectively in response to nonconduction and conduction of said second transistor, and means coupling said load resistor to said center tap of said primary winding of said output transformer to apply said opposite polarity biases thereto.

13. A chroma inverter according to claim 12, further defined by said separation means including a low-pass filter in said first channel, said low-pass filter having an output coupled to said adder means, a buffer amplifier in said first channel for coupling said composite signal to said low-pass filter, and a band-pass filter in said second channel coupled in receiving relation to said composite signal and having an output coupled to the primary winding of said input transformer, said low-pass filter having a cutoff frequency below that of the lower side band of said chroma component, said band-pass filter having a center frequency equal that of the color subcarrier of said chroma component and cutoff frequencies symmetrically encompassing the side bands thereof.

14. A chroma inverter according to claim 13, further defined by said first and second channels having equal time delays, and said band-pass filter having a phase versus frequency characteristic with bipolar inverse symmetry and zero phase occurring at the frequency of said color subcarrier.